(12) United States Patent
Terao

(10) Patent No.: US 10,186,235 B2
(45) Date of Patent: Jan. 22, 2019

(54) IMAGE DRAWING APPARATUS

(71) Applicant: DENSO CORPORATION, Kariya, Aichi-pref. (JP)

(72) Inventor: Iichiro Terao, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/516,330

(22) PCT Filed: Oct. 12, 2015

(86) PCT No.: PCT/JP2015/005158
§ 371 (c)(1),
(2) Date: Mar. 31, 2017

(87) PCT Pub. No.: WO2016/063486
PCT Pub. Date: Apr. 28, 2016

(65) Prior Publication Data
US 2017/0309252 A1    Oct. 26, 2017

(30) Foreign Application Priority Data
Oct. 23, 2014    (JP) .................................. 2014-216436

(51) Int. Cl.
*G09G 5/14*    (2006.01)
*G06F 3/14*    (2006.01)
(Continued)

(52) U.S. Cl.
CPC ................ *G09G 5/14* (2013.01); *G06F 3/14* (2013.01); *G06F 3/1423* (2013.01);
(Continued)

(58) Field of Classification Search
CPC combination set(s) only.
See application file for complete search history.

(56) References Cited

U.S. PATENT DOCUMENTS

2007/0005607 A1\* 1/2007 Fukuta .................... G06F 9/452
2007/0024753 A1    2/2007 Fujiwara et al.

FOREIGN PATENT DOCUMENTS

JP    2007028311 A    2/2007
JP    2009284023 A    12/2009
(Continued)

*Primary Examiner* — Wesner Sajous
(74) *Attorney, Agent, or Firm* — Harness, Dickey & Pierce, P.L.C.

(57) ABSTRACT

An image drawing apparatus includes a first processing apparatus and a second processing apparatus to execute drawing processing on a screen. A display preparation period of the first processing apparatus is shorter than a display preparation period of the second processing apparatus; the first processing apparatus displays an input image on the screen to receive an input manipulation by a user. Either the first processing apparatus or the second processing apparatus includes a notification section that executes notification processing that displays on the screen a notification image notifying the user. The notification processing is executable before completion of display preparation of the second processing apparatus. The notification image notifies the user that the second processing apparatus is incapable of updating an image displayed on the screen.

4 Claims, 7 Drawing Sheets

(51) Int. Cl.
*G06F 3/048* (2013.01)
*G06F 3/0481* (2013.01)

(52) U.S. Cl.
CPC .......... *G06F 3/1438* (2013.01); *G06F 3/1446* (2013.01); *G06F 3/0481* (2013.01); *G09G 2310/04* (2013.01); *G09G 2330/026* (2013.01); *G09G 2354/00* (2013.01); *G09G 2360/06* (2013.01); *G09G 2380/10* (2013.01)

(56) References Cited

FOREIGN PATENT DOCUMENTS

| | | | |
|---|---|---|---|
| JP | 2011123723 A | 6/2011 | |
| JP | WO 2014136406 A1 * | 9/2014 | ........... B62D 15/029 |

* cited by examiner

IMAGE DRAWING APPARATUS

CROSS REFERENCE TO RELATED APPLICATIONS

This application is a U.S. National Phase Application under 35 U.S.C. 371 of International Application No. PCT/JP2015/005158 filed on Oct. 12, 2015 and published in Japanese as WO 2016/063486 A1 on Apr. 28, 2016. This application is based on and claims the benefit of priority from Japanese Patent Application No. 2014-216436 filed on Oct. 23, 2014. The entire disclosures of all of the above applications are incorporated herein by reference.

FIELD OF INVENTION

The present disclosure relates to an image drawing apparatus that performs drawing on a screen of one display apparatus with multiple processing apparatuses.

BACKGROUND ART

There is known a display apparatus having one screen partitioned into multiple areas each displaying a different content. A vehicular apparatus disclosed in Patent Literature 1 partitions a display area of one screen into a main window and a sub window disposed adjacent to and smaller than the main window. It is effective to partition a display area of a large screen into a main window and a sub window. Road map images can be displayed on the main window. Manipulation images for audio-visual equipment and an air-conditioner can be displayed on the sub window. Detailed information on the sub window can be displayed on the main window.

The main window and sub window may be input windows for a user to input instructions to manipulate various apparatuses. When the user selects from switches on the screen, a control is executed in response to the selected switch.

PRIOR ART LITERATURES

Patent Literature

Patent Literature 1: JP 2011-123723 A

SUMMARY OF INVENTION

Various images can be displayed on the main window in addition to the road map images. An image defined by a manipulation on the sub window may be displayed on the main window. Different processing apparatuses may be provided to the main window and sub window separately to speedily draw images on the main window and sub window.

The processing apparatus that draws images on the main window and the processing apparatus that draws images on the sub window have different capabilities based on the processing loads. The processing apparatus for the main window and the processing apparatus for the sub window have different tasks executed at startup. After power-on, the time until an image is displayed on the main window may be different from the time until an image is displayed on the sub window. An image at startup may not be displayed on the main window yet while an image at startup is displayed on the sub window.

When the image at startup is displayed on the sub window but no image at startup is displayed on the main window, the image on the main window is not updated even though a user manipulates the sub window to update the image on the main window. This provides discomfort to the user.

It is an object of the present disclosure is to provide an image drawing apparatus to execute drawing processing on one screen by using multiple processing apparatuses with providing less discomfort to a user at startup.

To achieve the above object, according to an example of the present disclosure, an image drawing apparatus is provided to include processing apparatuses in communication with each other, the processing apparatuses including a first processing apparatus and a second processing apparatus to execute drawing processing on a screen that is single by using the processing apparatuses. A display preparation period of the first processing apparatus is shorter than a display preparation period of the second processing apparatus. The first processing apparatus displays an input image on the screen to receive an input manipulation by a user. At least either the first processing apparatus or the second processing apparatus includes a notification section that executes notification processing that displays on the screen a notification image notifying the user that the second processing apparatus is incapable of updating an image displayed on the screen by controlling a display time point through communication between the first processing apparatus and the second processing apparatus. The notification processing is executable before completion of display preparation of the second processing apparatus.

According to the present example, at least one of a first processing apparatus and a second processing apparatus displays, on a screen, a notification image to notify a user that an image displayed on the screen by the second processing apparatus cannot be updated. The notification processing that displays the notification image is executable before display preparation of the second processing apparatus completes. The notification image can be therefore displayed when the image displayed on the screen by the second processing apparatus cannot be updated. The user knows, from the notification image displayed on the screen, that the image displayed on the screen by the second processing apparatus cannot be updated. The user is thus suppressed from performing an input manipulation to update the image on the screen without knowing that the image cannot be updated. Thus, the user can be suppressed from experiencing the discomfort when the image on the screen is not updated despite an input manipulation of updating the image.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

<First Embodiment>

Figure 1:
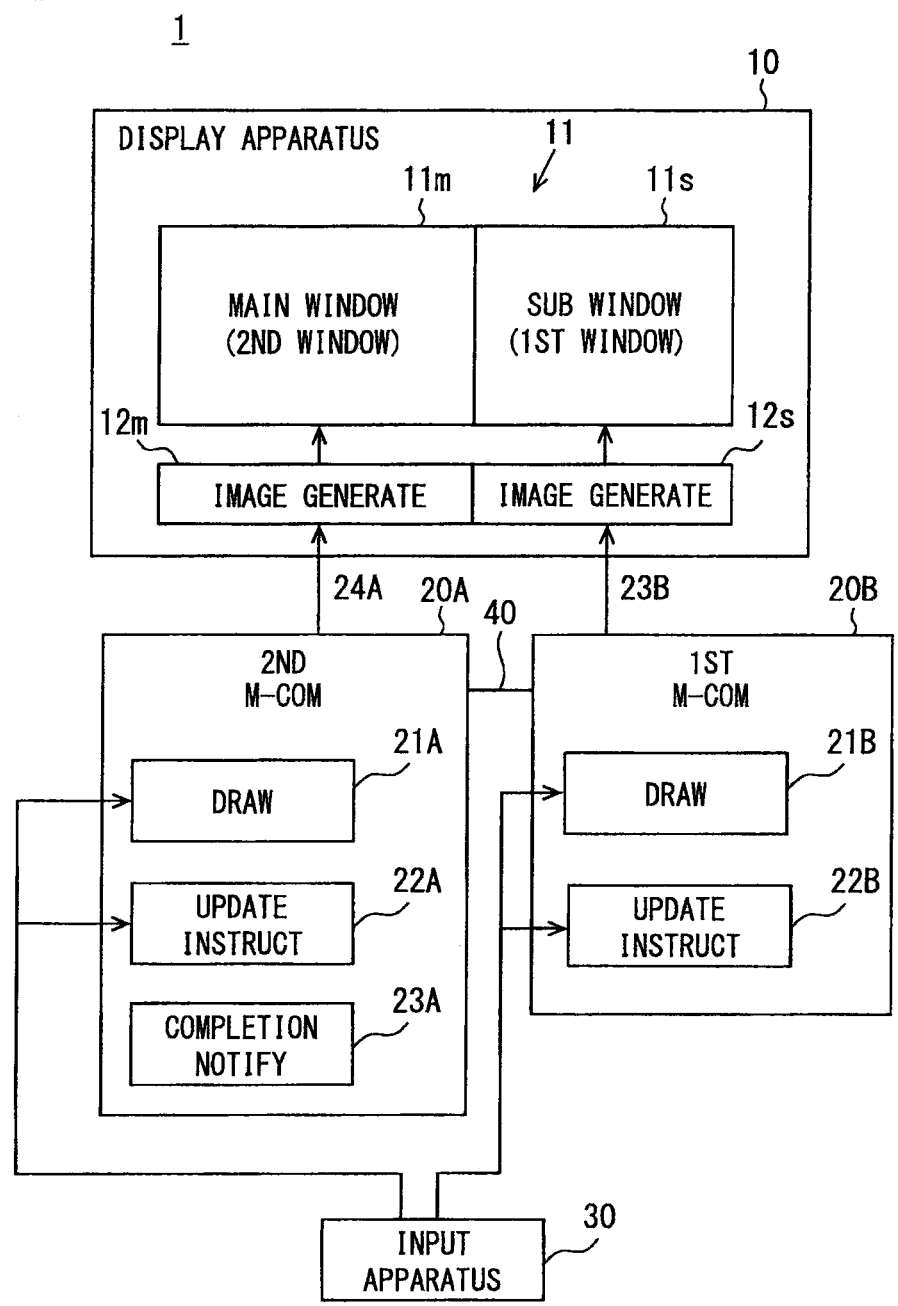
FIG. 1 is a block diagram illustrating a structure of an in-vehicle display system of a first embodiment.

Hereafter, an embodiment of the present disclosure is described based on the drawings. An in-vehicle display system 1 in FIG. 1 is mounted to a vehicle, and includes a display apparatus 10, at least two microcomputers of a first microcomputer 20B and a second microcomputer 20A, and an input apparatus 30.

(Structure of Display Apparatus 10)

The display apparatus 10 includes one screen 11 (also called a display screen). The screen 11 includes a main window 11m (also called a second window or a second display area) and a sub window 11s (also called a first window or a first display area). An image generator 12m is provided corresponding to the main window 11m. An image generator 12s is provided corresponding to the sub window 11s. The display apparatus 10 is installed in the position where the screen 11 is visible by a driver on the driver's seat.

The image generator 12m generates images displayed on the main window 11m, and as a liquid crystal display, includes a liquid crystal layer, a polarizing plate, and a light source. The image generator 12s generates images displayed on the sub window 11s, and has the same structure as the image generator 12m.

An image drawing apparatus is provided to include the second microcomputer 20A and first microcomputer 20B. The second microcomputer 20A and first microcomputer 20B are in communication with each other by a communication line 40.

(Structure of Second Microcomputer 20A)

The second microcomputer 20A is also called a second processing apparatus. This second microcomputer 20A includes a CPU, ROM, and RAM. The CPU executes programs in the ROM while using a temporary storage function of the RAM to function as a drawing section 21A, an update instruction section 22A, and a completion notification section 23A. The sections are also called devices or modules. Part or all of the functions executed by the second microcomputer 20A may be hardwired by one or more ICs.

The second microcomputer 20A performs startup processing to activate predetermined functions such as the sections 21A, 22A, and 23A and other functions at power-on and startup.

The drawing section 21A transmits an image generation signal 24A to the image generator 12m to make the image generator 12m generate an image displayed on the main window 11m. When the image generator 12m generates the image, the image is displayed on the main window 11m.

The images that the drawing section 21A makes the image generator 12m generate include an image for a user to manipulate audio equipment and various images displayed during execution of a navigation function. The drawing section 21A determines which image is selected by an input signal indicated from the input apparatus 30 based on the input signal and the image displayed when the input signal is inputted. Based on the determination result, the image that the image generator 12m is made to generate is changed.

As above, the second microcomputer 20A performs the startup processing at startup. The startup processing also includes preparation for the drawing section 21A to display images. The display preparation processing launches a program that controls the audio equipment and a program that executes navigation functions. The images displayed on the main window 11m cannot be switched during a display preparation period Tp (A), which is a period from power-on of the second microcomputer 20A to completion of the display preparation.

The update instruction section 22A determines which image is selected by an input signal inputted from the input apparatus 30 based on the image that the drawing section 21A makes the image generator 12m draw and the input signal. Based on this determination result, it is further determined whether the image displayed on the sub window 11s needs to be changed. When it is determined that the image displayed on the sub window 11s needs to be changed, an update instruction signal is transmitted to the drawing section 21B of the first microcomputer 20B.

The completion notification section 23A transmits a preparation completion signal indicating completion to the first microcomputer 20B when the display preparation of the drawing section 21A completes.

(Structure of First Microcomputer 20B)

The first microcomputer 20B is also called a first processing apparatus. The first microcomputer 20B also includes a CPU, ROM, and RAM. The CPU executes programs in the ROM with using a temporary storage function of the RAM. The first microcomputer 20B thereby functions as the drawing section 21B and update instruction section 22B. These sections are also called devices or modules. Part or all of the functions executed by the first microcomputer 20B may be also hardwired by one or more ICs.

The first microcomputer 20B also activates predetermined functions such as the sections 21B and 22B and other functions at power-on and startup. The drawing section 21B transmits an image generation signal 23B to the image generator 12s to make the image generator 12s generate an image displayed on the sub window 11s. When the image generator 12s generates the image, the image is displayed on the sub window 11s.

The first microcomputer 20B also performs the startup processing at startup. The startup processing executed by the first microcomputer 20B also includes display preparation for the drawing section 21B to display images. During a display preparation period Tp (B), which is a period from power-on of the first microcomputer 20B to completion of the display preparation, the image displayed on the sub window 11s cannot be switched. Since the amount of calculation at startup of the first microcomputer 20B is less than that of the second microcomputer 20A, the display preparation period at startup of the first microcomputer 20B is shorter than that of the second microcomputer 20A.

The display preparation of the first microcomputer 20B therefore completes earlier than that of the second microcomputer 20A. However, the second microcomputer 20A cannot update the main window 11m until the display preparation of the second microcomputer 20A completes even when instructed to update the main window 11m.

Figure 2:
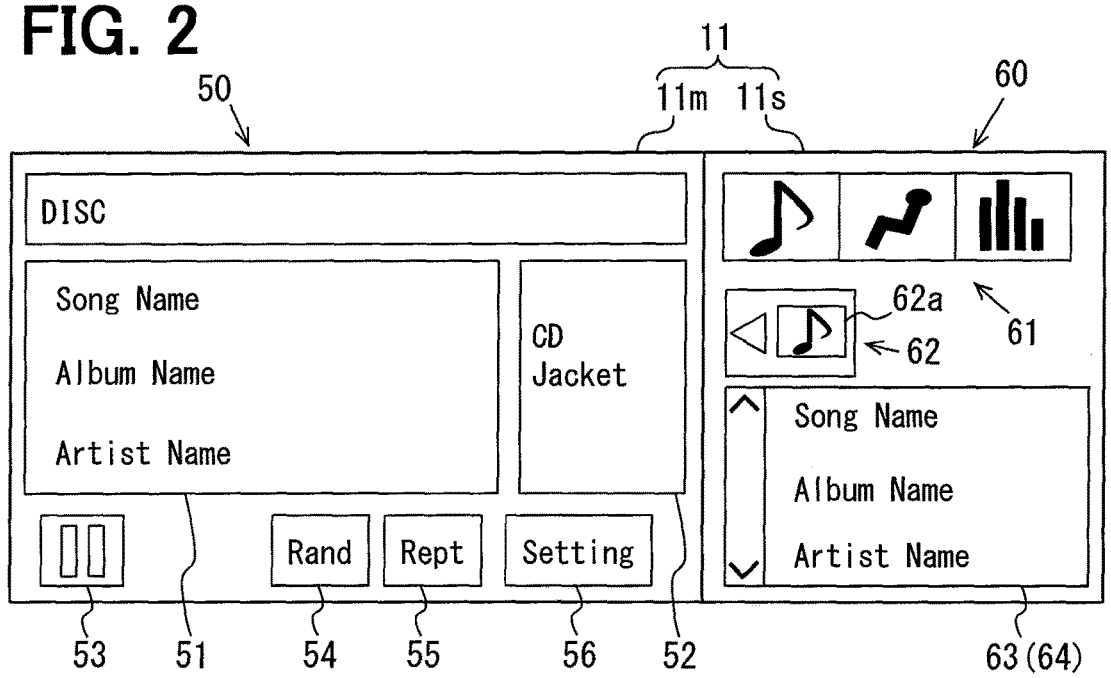
FIG. 2 illustrates a screen displaying an after-startup image.
Figure 4:
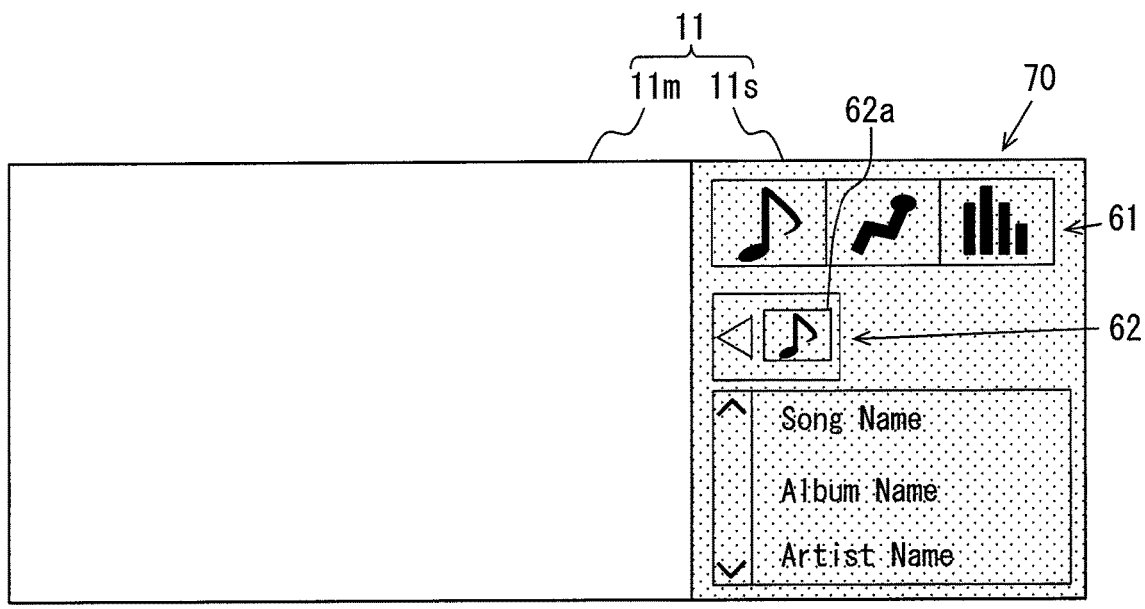
FIG. 4 illustrates a screen displaying a preparation image.

Then, the drawing section 21B disables switch manipulations in the sub window 11s until completion of the display preparation of the second microcomputer 20A. To indicate that switch manipulations are disabled in the sub window 11s, the sub window 11s displays, on the sub window 11s, an image different in color tone from an image (hereinafter, an after-startup image 60) displayed on the sub window 11s after completion of the display preparation of the second microcomputer 20A. The image different in color tone from the after-startup image 60 is displayed on the sub window 11s during the display preparation of the second microcomputer 20A, and thus called a preparation image 70 hereinafter. FIG. 2 illustrates the after-startup image 60. FIG. 4 illustrates the preparation image 70. These are explained later.

The color tone signifies a system of colors distinguished by lightness and saturation. The after-startup image 60 is grayed out or toned down in color tone in the present embodiment.

After the preparation image 70 is displayed on the sub window 11s, the completion notification section 23A of the second microcomputer 20A may notify the drawing section 21B of the first microcomputer 20B that the display preparation of the second microcomputer 20A completes. In such cases, the drawing section 21B of the first microcomputer 20B switches from the preparation image 70 to the after-startup image 60 on the sub window 11s.

The first microcomputer 20B can display the preparation image 70 when the display preparation of the first microcomputer 20B completes. The display preparation of the first microcomputer 20B completes before the display preparation of the second microcomputer 20A. That is, the preparation image 70 can be displayed before the display preparation of the second microcomputer 20A completes.

Since the preparation image 70 is greyed out or toned down relative to the after-startup image 60, the user can recognize that the switches displayed on the preparation image 70 cannot be manipulated yet. The preparation image 70 includes switch images the user manipulates to update the display of the main window 11m. The switch images include a main-window call switch image 62 in FIG. 4.

Since the preparation image 70 is entirely greyed out or toned down in color tone relative to the after-startup image 60, the main-window call switch image 62 is also greyed out or toned down in color tone. The user can therefore recognize that the main-window call switch image 62 cannot be manipulated. That is, the main-window call switch image 62 contained in the preparation image 70 and greyed out or toned down relative to the after-startup image 60 notifies the user that the main window 11m cannot be updated. Therefore, the preparation image 70 is also called a notification image because the preparation image 70 notifies the user that the main window 11m cannot be updated. The drawing section 21B that displays the preparation image 70 is also called a notification section.

The display termination time point in the display time points for the preparation image 70 is a time point for the first microcomputer 20B to acquire a preparation completion signal from the second microcomputer 20A by communications via the communication line 40. When acquiring the preparation completion signal, the drawing section 21B of the first microcomputer 20B switches the image on the sub window 11s from the preparation image 70 to the after-startup image 60.

The update instruction section 22B determines which image is selected by the input signal inputted from the input apparatus 30 based on the image that the drawing section 21B makes the image generator 12s draw and on the input signal. Based on this determination result, it is further determined whether the image on the main window 11m needs to be changed. When it is determined that the image on the main window 11m needs to be changed, an update instruction signal is transmitted to the drawing section 21A of the second microcomputer 20A.

The input apparatus 30 is a remote control apparatus spaced from the display apparatus 10. This remote control apparatus includes a movement manipulation section the user manipulates to move a pointer displayed on the screen 11 and a selection manipulation section the user manipulates to select the image displayed at the pointer. In addition to or instead of the remote control apparatus, a touch panel overlaid on the screen 11 may be provided as the input apparatus 30.

(Example of Image of Screen 11)

FIG. 2 illustrates an example of an image displayed on the screen 11. The example of FIG. 2 illustrates a disc image 50 displayed on the main window 11m. The disc image 50 includes a song information image 51, CD-jacket image 52, pause switch image 53, random-play switch image 54, repeat-play switch image 55, and setting switch image 56.

The song information image 51 indicates a song name, album name, and artist name. The CD-jacket image 52 is an image of the selected CD jacket. The pause switch image 53 is selected by the user to pause a playing song. The random-play switch image 54 indicates a switch selected by the user to change the play mode to the random play mode. The repeat-play switch image 55 indicates a switch selected by the user to change the play mode to the repeat play mode.

FIG. 2 illustrates the after-startup image 60 on the sub window 11s. The after-startup image 60 in the example of FIG. 2 includes a switch image 61, main-window call switch image 62, and song information image 63.

The switch image 61 indicates a switch selected by the user to switch a type of the image below the switch image 61 on the sub window 11s. The main-window call switch image 62 is a switch selected by the user to switch the image displayed on the main window 11m. The main-window call switch image 62 includes a type image 62a indicating a type of the image to be called. The after-startup image 60 including the main-window call switch image 62 is also called an input image.

When the main-window call switch image 62 is selected, the update instruction section 22B of the first microcomputer 20B upon the selection transmits, to the second microcomputer 20A, an update instruction signal that instructs the second microcomputer 20A to display the image of the type indicated by the type image 62a on the main window 11m.

The song information image 63 indicates the same information as the song information image 51 of the main window 11m. The area displaying the song information image 63 on the sub window 11s is a detailed-display area 64 displaying various images in addition to the song information image 63. The image on the detailed-display area 64 may relate to the image on the main window 11m.

When an image relating to the image displayed on the main window 11m is displayed on the sub window 11s, the update instruction section 22A of the second microcomputer 20A transmits an update instruction signal to the first microcomputer 20B. When receiving the update instruction signal, the first microcomputer 20B switches the image on the detailed-display area 64 based on the received update instruction signal.

(Processing Sequence of Second Microcomputer 20A and First Microcomputer) 20B

Figure 3:
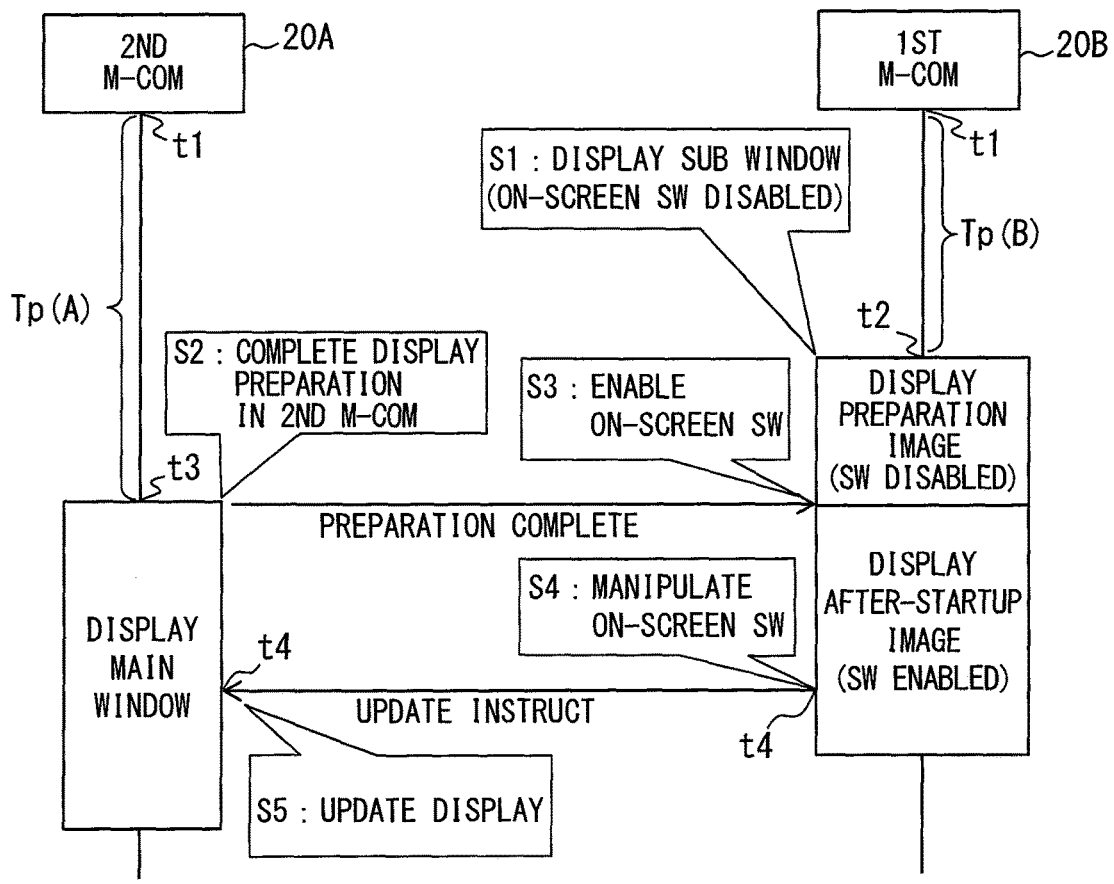
FIG. 3 is a sequence diagram illustrating processing of a microcomputer.

FIG. 3 is a sequence diagram illustrating processes of the second microcomputer 20A and first microcomputer 20B. The downward straight lines from the second microcomputer 20A and first microcomputer 20B indicate time axes.

Each process executed in the sequence is also called a section or a step, and described as S1.

The second microcomputer 20A and first microcomputer 20B are simultaneously powered on at a time t1. When powered on, the second microcomputer 20A and first microcomputer 20B launch programs to be launched at startup to initiate startup processing including display preparation.

As in FIG. 3, the display preparation period Tp (B) of the first microcomputer 20B expires earlier than the display preparation period Tp (A) of the second microcomputer 20A. The display preparation period Tp (B) of the first microcomputer 20B therefore expires at a time t2. When the display preparation period Tp (B) expires, the drawing section 21B of the first microcomputer 20B displays the preparation image 70 on the sub window 11s (S1). When the preparation image 70 is displayed on the sub window 11s, the display preparation period Tp (A) of the second microcomputer 20A does not expire yet. Therefore, as in FIG. 4, no image is displayed on the main window 11m of the screen 11. In contrast, the preparation image 70 is displayed on the sub window 11s.

While the preparation image 70 is displayed, switch manipulations in the preparation image 70 are also disabled. That is, selections of various switches in the preparation image 70 are not received.

At a time t3, the display preparation period Tp (A) of the second microcomputer 20A expires. That is, the display preparation for the main window 11m completes. At this time, the completion notification section 23A transmits a preparation completion signal to the first microcomputer 20B via the communication line 40 (S2).

When receiving the preparation completion signal, the first microcomputer 20B changes in color tone the preparation image 70 on the sub window 11s to the after-startup image 60. Additionally, the switch manipulations in the after-startup image 60 are enabled (S3).

At a time t4 after that, when a switch in the sub window 11s is manipulated to change the image on the main window 11m, an update instruction signal is transmitted to the drawing section 21A of the second microcomputer 20A (S4).

The second microcomputer 20A that has received the update instruction signal updates the image on the main window 11m to the image defined based on the update instruction signal.

(Effect of First Embodiment)

According to the above embodiment, the drawing section 21B of the first microcomputer 20B displays the preparation image 70 on the sub window 11s to notify the user that the second microcomputer 20A cannot update the image on the main window 11m. The processing that displays the preparation image 70 is executable before completion of display preparation of the second microcomputer 20A. Therefore, while the second microcomputer 20A cannot update the image on the main window 11m, the preparation image 70 can be displayed.

The preparation image 70 is displayed on the sub window 11s to notify the user that the screen 11 cannot be updated. Therefore, the user is suppressed from performing an input manipulation to update the image on the screen 11 without knowing that the image cannot be updated. Thus, the user can feel less discomfort when the image on the screen 11 is not updated despite an input manipulation of updating the image.

When the image on the main window 11m is changed before display preparation of the second microcomputer 20A completes, the display preparation may be affected. The present embodiment however suppresses the image on the main window 11m from being changed before completion of the display preparation. This also suppresses troubles during the display preparation.

<Second Embodiment>

Next, a second embodiment is explained. In the second embodiment or after, components having the same reference numerals as the above ones are the same as the components having the same reference numerals in the above embodiment unless otherwise stated. When only part of a structure is explained, the other part can be applied with the above embodiment.

Figure 5:
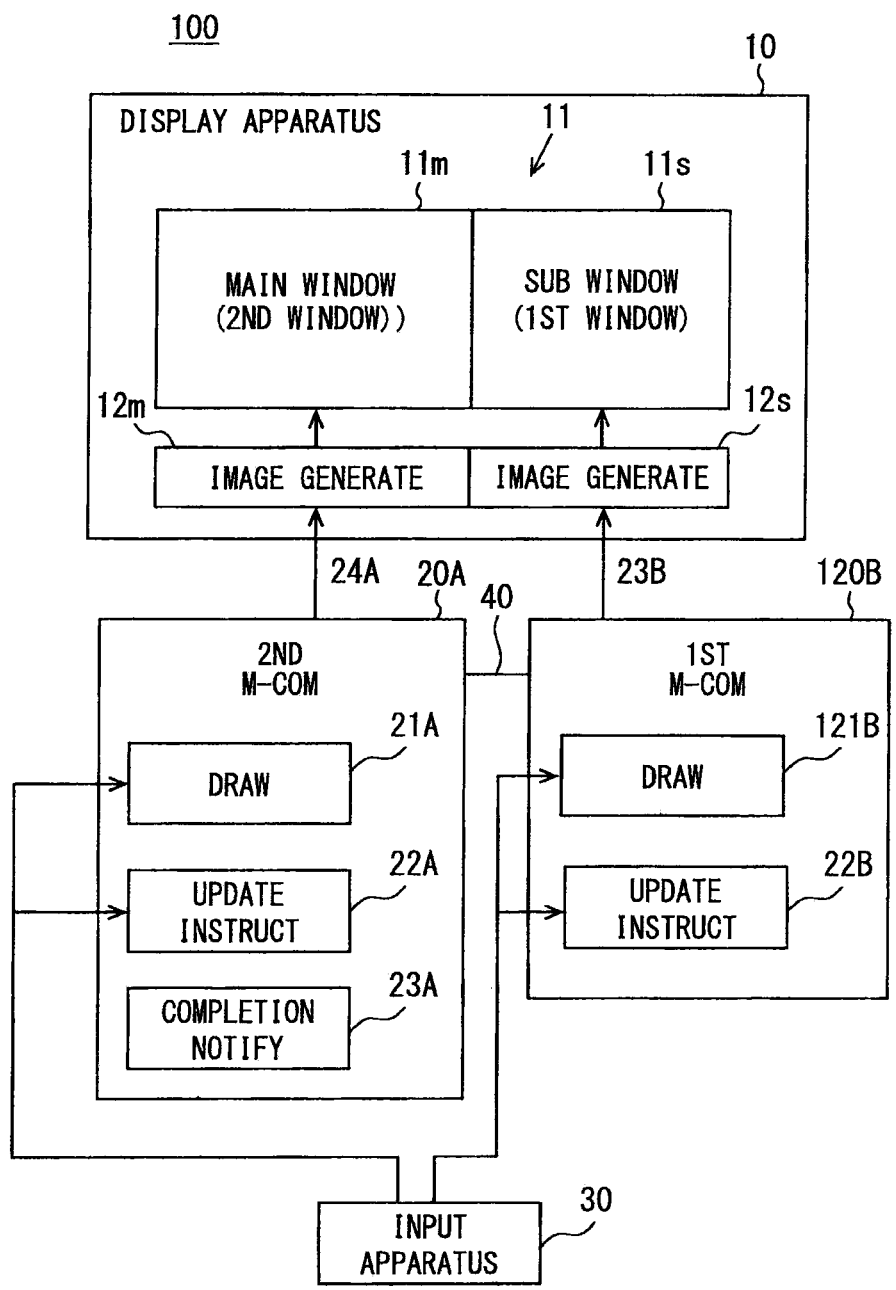
FIG. 5 is a block diagram illustrating a structure of an in-vehicle display system of a second embodiment.

As in FIG. 5, an in-vehicle display system 100 of the second embodiment includes a first microcomputer 120B instead of the first microcomputer 20B of the first embodiment. The other components are the same as in the first embodiment.

The first microcomputer 120B includes a drawing section 121B instead of the drawing section 21B of the first embodiment, and includes the update instruction section 22B same as in the first embodiment. After the display preparation period Tp (B) expires, the drawing section 121B displays a different image on the sub window 11s from that displayed by the drawing section 21B of the first embodiment. The other part is the same as in the drawing section 21B of the first embodiment.

Figure 6:
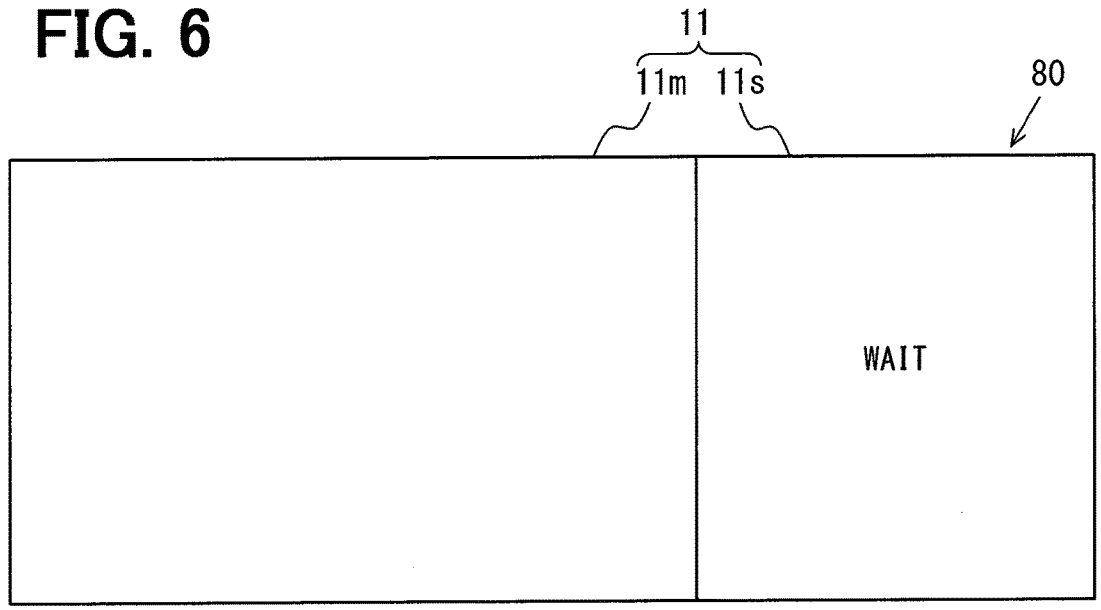
FIG. 6 illustrates a screen displaying a preparation image of the second embodiment.

Specifically, the drawing section 121B displays a preparation image 80 in FIG. 6 on the sub window 11s when the display preparation period Tp (B) expires. As in FIG. 6, the preparation image 80 indicates a message "Wait for a while." The user who has seen the preparation image 80 knows that startup is in progress. Therefore, the message displayed on the preparation image 80 is also called a starting-up message or a notification image. The drawing section 121B is also called a notification section.

Figure 7:
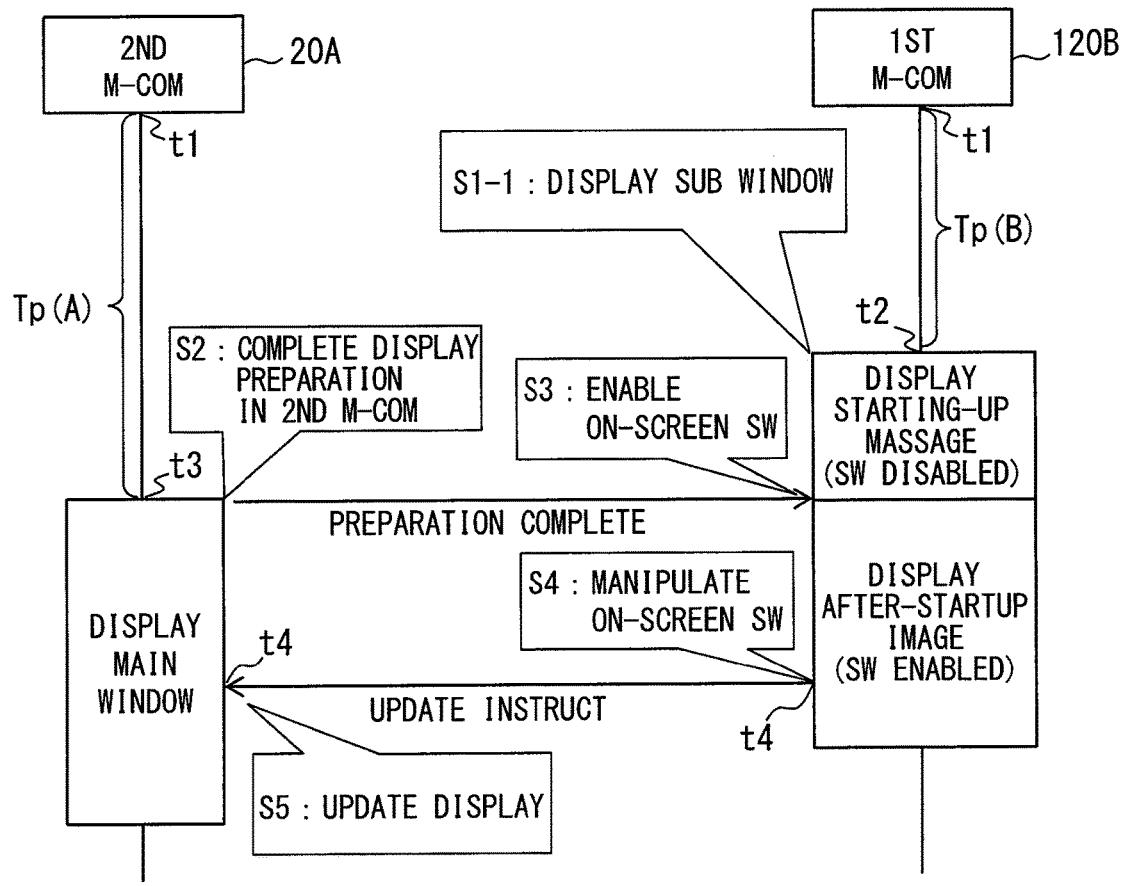
FIG. 7 is a sequence diagram illustrating processing of a microcomputer of the second embodiment.

Next, processing of the drawing section 121B is explained using the sequence diagram in FIG. 7. The first microcomputer 120B displays, on the sub window 11s, the above preparation image 80 indicating the starting-up message at the time t2 when the display preparation period Tp (B) expires (S1-1). Since no switch is displayed on the preparation image 80, the switch manipulation on the sub window 11s is also disabled naturally.

The second microcomputer 20A does not complete the display preparation yet while displaying the preparation image 80 on the sub window 11s. Nothing is therefore displayed on the main window 11m as in FIG. 6.

The processing after the time t2 is the same as in the first embodiment. When the display preparation of the second microcomputer 20A completes at the time t3, the completion notification section 23A transmits the preparation completion signal to the first microcomputer 20B (S2). When receiving the preparation completion signal, the first microcomputer 20B eliminates the preparation image 80, displays the after-startup image 60 instead, and enables the switch manipulation in the after-startup image 60 (S3).

<Third Embodiment>

Figure 8:
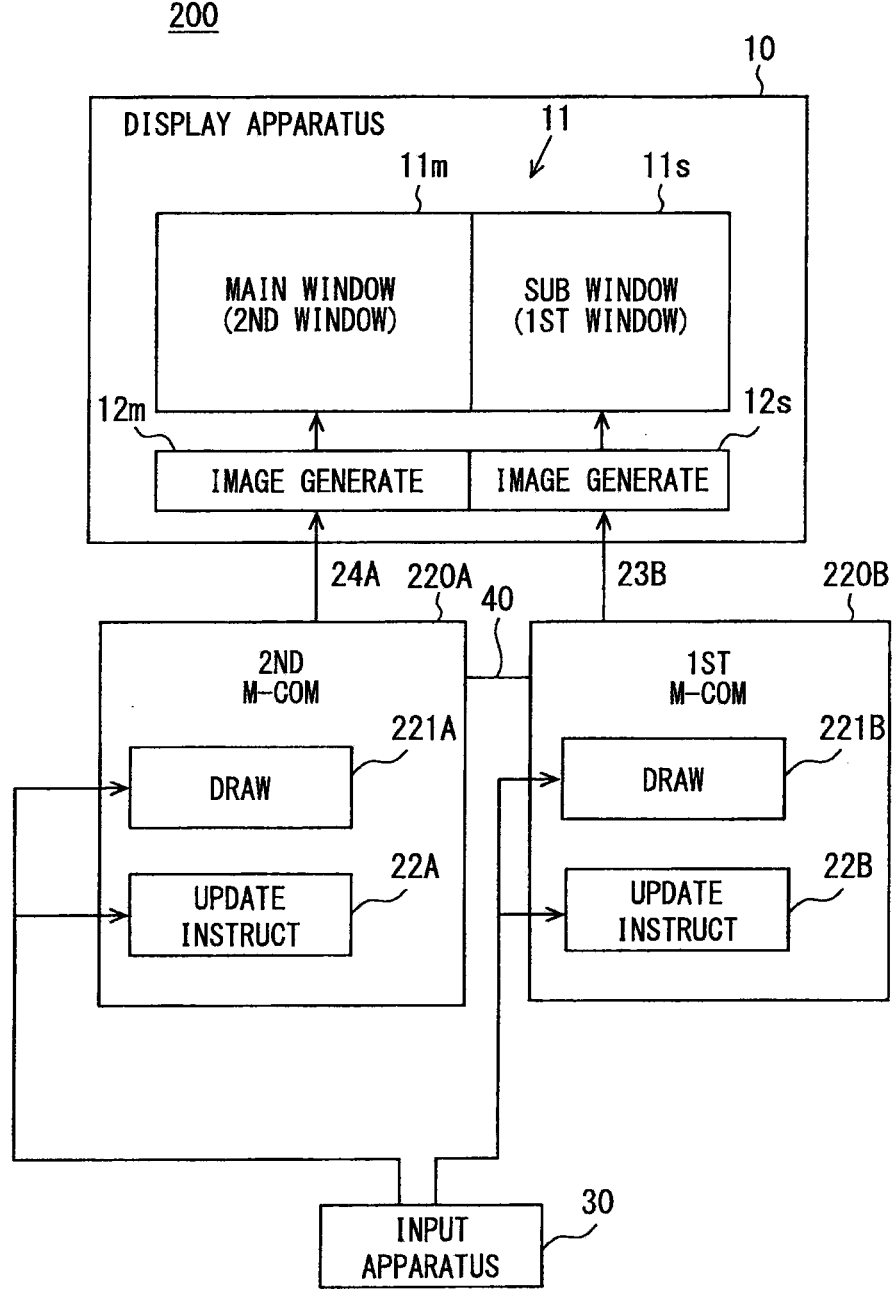
FIG. 8 is a block diagram illustrating a structure of an in-vehicle display system of a third embodiment.

Next, a third embodiment is described. As in FIG. 8, an in-vehicle display system 200 of the third embodiment includes a second microcomputer 220A and a first microcomputer 220B instead of the second microcomputer 20A and first microcomputer 20B of the first embodiment. The other components are the same as in the first embodiment.

The second microcomputer 220A includes a drawing section 221A instead of the drawing section 21A of the first embodiment, and includes the update instruction section 22A the same as in the first embodiment. In contrast, the second microcomputer 220A does not include the completion notification section 23A in the second microcomputer 20A of the first embodiment.

The display preparation of the drawing section 221A is different from that of the drawing section 21A of the first embodiment. Specifically, during display preparation, the drawing section 221A preferentially launches a preparation display program informing that the display preparation is in progress.

The preparation display program displays, on the main window 11m, a preparation image 90 displaying a message indicating that startup is in progress when an update instruction signal is transmitted from the first microcomputer 220B before completion of the display preparation.

Figure 9:
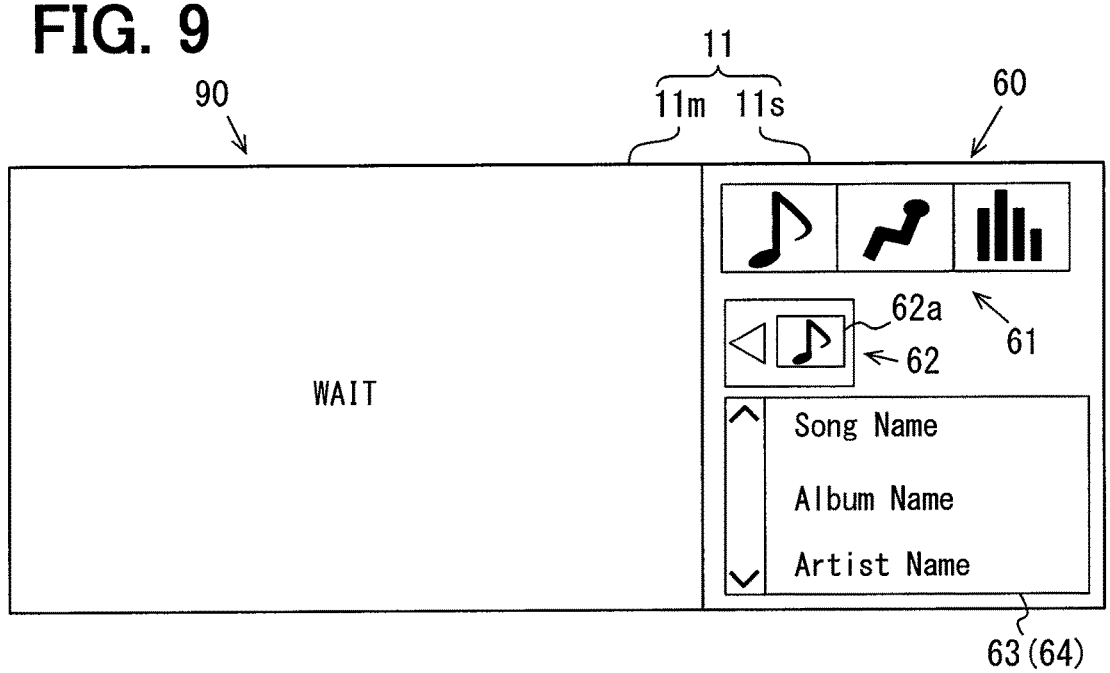
FIG. 9 illustrates a screen displaying a preparation image of the third embodiment.

FIG. 9 illustrates the preparation image 90. The preparation image 90 in FIG. 9 indicates the message "wait for a while" as a message that signifies that startup is in progress. The preparation image 90 is also called a notification image as well as the preparation image 80 of the second embodiment. The drawing section 221A is also called a notification section.

The preparation display program determines that the update instruction signal is transmitted, and can be launched immediately because the program only displays the preparation image 90 on the main window 11m. The drawing section 221A launches the preparation display program before the display preparation period Tp (B) of the first microcomputer 220B expires. The rest processes of the drawing section 221A are the same as in the drawing section 21A of the first embodiment.

The first microcomputer 220B includes a drawing section 221B instead of the drawing section 21B of the first embodiment and the drawing section 121B of the second embodiment, and includes the update instruction section 22B the same as in the first and second embodiments. The drawing section 221B displays the after-startup image 60 on the sub window 11s immediately without displaying the images 70 and 80 after the display preparation period Tp (B) expires. Switch manipulations in the sub window 11s are enabled after the after-startup image 60 is displayed. The other processes are the same as in the drawing section 21B of the first embodiment.

Figure 10:
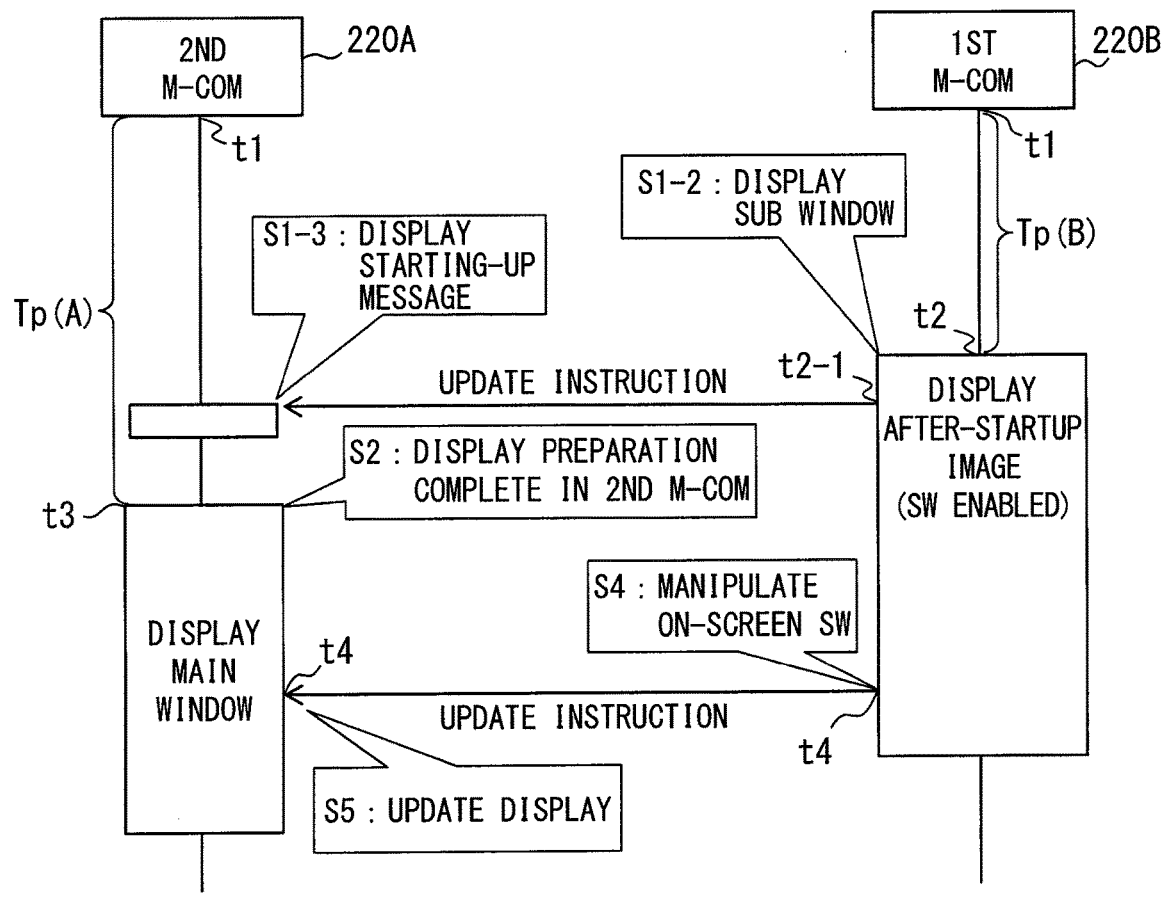
FIG. 10 is a sequence diagram illustrating processing of a microcomputer of the third embodiment.

Next, processing of the drawing sections 221A and 221B is explained using the sequence diagram in FIG. 10. At the time t2 when the display preparation period Tp (B) expires, the first microcomputer 220B enables switch manipulations in the sub window 11s with displaying the after-startup image 60 on the sub window 11s (S1-2).

For this reason, even when the display preparation period Tp (A) of the second microcomputer 220A does not expire, an update instruction signal may be transmitted from the first microcomputer 220B to the second microcomputer 220A at a time t2-1.

When the update instruction signal is transmitted before the display preparation period Tp (A) expires, the second microcomputer 220A displays the preparation image 90 on the main window 11m for a predetermined time as in FIG. 9 (S1-3). The processing after the time t3 when the display preparation period Tp of the second microcomputer 220A (A) expires is the same as in FIG. 3.

(Modification)

The first embodiment disables switch manipulations in the sub window 11s with displaying the preparation image 70, but it is not necessary to disable the switch manipulations (First Modification).

When the switch manipulations in the preparation image 70 are enabled, it is preferable to display the preparation image 90 on the main window 11m on transmission of the update instruction signal to the second microcomputer 20A in combination with the third embodiment (Second Modification).

While the present disclosure has been described with reference to embodiments thereof, it is to be understood that the disclosure is not limited to the embodiments and constructions. The present disclosure is intended to cover various modification and equivalent arrangements. In addition, the various combinations and configurations, other combinations and configurations, including more, less or only a single element, are also within the spirit and scope of the present disclosure.

The invention claimed is:

1. An image drawing apparatus comprising:
a plurality of processing apparatuses in communication with each other, including a first processing apparatus and a second processing apparatus to execute drawing processing on one screen by using the plurality of processing apparatuses,
the first processing apparatus having a first display preparation period at startup,
the second processing apparatus having a second display preparation period at startup,
the first display preparation period being shorter than the second display preparation period,
the first processing apparatus displaying an input image on the one screen to receive an input manipulation by a user,
at least either the first processing apparatus or the second processing apparatus including:
a notification section that executes notification processing that displays on the one screen a notification image notifying the user that the second processing apparatus is incapable of updating an image displayed on the one screen, by controlling a display time point through communication between the first processing apparatus and the second processing apparatus,
the notification processing being executable before completion of display preparation of the second processing apparatus.

2. The image drawing apparatus according to claim 1 wherein:
the second processing apparatus transmits a preparation completion signal indicating completion of display preparation at startup to the first processing apparatus when the display preparation completes;
the first processing apparatus includes the notification section; and
the notification section
displays the notification image on the one screen based on completion of display preparation at startup of the first processing apparatus, the notification image being differed in color tone from the input image that is to be displayed after receiving the preparation completion signal from the second processing apparatus, and
changes the notification image in color tone to the input image based on reception of the preparation completion signal from the second processing apparatus.

3. The image drawing apparatus according to claim 1 wherein:
the second processing apparatus transmits the preparation completion signal indicating completion of display preparation at startup to the first processing apparatus when the display preparation completes;

the first processing apparatus includes the notification section; and the notification section displays the notification image on the one screen based on completion of display preparation of the first processing apparatus at startup, the notification image being a starting-up message signifying that startup is in progress, and eliminates the starting-up message and displays the input image on the one screen based on reception of the preparation completion signal from the second processing apparatus.

4. The image drawing apparatus according to claim 1 wherein:

the second processing apparatus includes the notification section;

the first processing apparatus displays the input image based on completion of display preparation at startup;

when an input manipulation on the input image by a user is an instruction to update an image displayed on the one screen by the second processing apparatus, the first processing apparatus transmits an update instruction signal indicating the instruction to the second processing apparatus; and the notification section included in the second processing apparatus displays the notification image on the one screen, the notification image being a starting-up message signifying that startup is in progress when receiving the update instruction signal during a period in which display preparation of the second processing apparatus at startup does not complete.

* * * * *